United States Patent Office 3,178,404
Patented Apr. 13, 1965

3,178,404
PREPARATION OF POLYETHYLENE IN A TWO ZONE REACTOR EMPLOYING CAPRYLYL PEROXIDE IN THE FIRST ZONE AS THE CATALYST
Samuel B. Vaughn, Jr., and Hugh J. Hagemeyer, Jr., Longview, Tex., assignors to Eastman Kodak Company, Rochester, N.Y., a corporation of New Jersey
No Drawing. Continuation of application Ser. No. 861,453, Dec. 23, 1959. This application July 30, 1962, Ser. No. 213,124
12 Claims. (Cl. 260—94.9)

This invention relates to a novel process for the polymerization of ethylene and, more particularly to the use of an organic peroxide in such a process. In a specific aspect, this invention relates to a novel two-zone process for the polymerization of ethylene in the presence of an organic peroxide catalyst.

Polyethylene has been described rather extensively in the literature, and it has been produced commercially in a variety of types having distinct properties. These different types of polyethylene have been separately classified and distinguished primarily by the density of the polymer. The first type of polyethylene that was produced commercially was of the so-called low density type. This type of polyethylene has been produced for some years in accordance with the process described by Fawcett et al. in U.S. Patent No. 2,153,553. This low density form of polyethylene is usually regarded as having a density within the range of 0.90 to 0.935 and, because of the high content of amorphous polymer, this type of polyethylene has relatively low hardness, low stiffness and low melting point when compared with more highly crystalline ethylene polymers. Many variations of the Fawcett et al. process have been performed in an attempt to modify the product properties. Such variations include the use of various reactor designs, catalysts and chain transfer agents.

Due to the unique properties of polyethylene this polymer is particularly useful in the film and packaging field and, for such uses, the low density form of polyethylene as contrasted with the medium and high density forms has been found to be the most desirable type. Low density polyethylene can be formed into a film and it possesses the toughness required for this use. However, conventional, low density polyethylene such as is produced by the process set forth in the Fawcett et al. patent is considered to have a limited potential in the film and packaging field because this polymer has been known to be deficient in some of it properties for use in this particular field. For example, low density polyethylene when in the form of a film has not possessed the desired transparency and clarity for some uses in the film and packaging field. Numerous suggestions have been made for improving the clarity and transparency of low density polyethylene but none of these have been completely satisfactory.

Accordingly, it is an object of this invention to provide a new process for the preparation of low density polyethylene.

It is a further object of this invention to provide a new process for the preparation of low density polyethylene in the presence of an organic peroxide catalyst.

Another object of this invention is to provide a process capable of producing new low density ethylene polymer which is suitable for use in the packaging field.

Another object of this invention is to provide a process for preparing low density ethylene polymer having higher film transparency and gloss, lower film haze and blocking, and higher stiffness and softening point than the low density ethylene polymers now being produced.

In accordance with this invention, it has been found that low density ethylene polymers having excellent characteristics for use in the film and packaging field can be produced by polymerizing ethylene in two stages or zones using caprylyl peroxide as the catalyst in the first stage or zone. In practicing this invention, ethylene is polymerized in two zones at a temperature in the range of about 130° to 270° C., the catalyst in the first zone comprising caprylyl peroxide, the temperature in said zone being substantially less than that in the second zone, and the pressure throughout said polymerization being greater than about 500 atmospheres.

It is believed that this is the first use of caprylyl peroxide as a catalyst under the reaction conditions set forth in the basic Fawcett et al. patent referred to previously. Furthermore, until the present invention, no one has endeavored to employ caprylyl peroxide in a two zone polymerization procedure under the conditions which are described in that patent. Moreover, as will be shown by the following specification, polyethylene can be produced in higher yields, based on the catalyst, than those yields now being produced using a conventional catalyst such as lauroyl peroxide and, because of the solubility and stability of the catalyst, smaller and less complicated catalyst handling facilities are possible.

The catalyst employed in the practice of this invention has been described by Doehnert and Mageli (D. F. Doehnert and O. L. Mageli, "Evaluation of Organic Peroxides on the Basis of Half-Life Date." Preliminary copy of paper presented at the 13th Annual Meeting of the Reinforced Plastics Division) as having the following general formula:

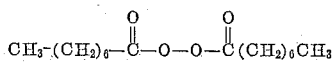

In conducting our polymerization reaction we feed the catalyst into the reaction zone in solution in a suitable solvent or diluent. The nature of the organic vehicle employed is subject to considerable variation. The well-known inert liquid hydrocarbons are desirably employed. Catalyst concentrations of 5 to 50 weight percent in mineral oil and 20 weight percent in a relatively low boiling solvent can be used to great advantage when feeding catalyst into the reaction zone. Due to the excellent solubility of the caprylyl peroxide the 50 weight percent solution can be used even at room temperature. This is of great commercial importance in that fewer expensive catalyst pumps must be used and heated catalyst handling facilities are unnecessary. The amount of catalyst employed will vary with the conditions utilized and includes those conventional catalytic amounts which are known to those skilled in the art.

As pointed out hereinbefore, the process of this invention is carried out as a two-step or two-zone reaction. The temperature throughout this polymerization process is maintained within the range of about 130° C. to 270° C. and, more preferably, within the range of about 130° to 250° C. The temperature in the first zone can be maintained within the range of about 130° to about 190° C., and more preferably within the range of about 150° to 190° C., while the temperature in the second zone is substantially greater and can be maintained within the range of about 190° to about 270° C., and more preferably, within the range of about 190° to about 250° C.

The pressure employed throughout the ethylene polymerization process of this invention is maintained at 500 atmospheres or more, a preferred range being about 500 to about 3000 atmospheres.

In carrying out a typical two-stage or two-zone reaction process ethylene is fed into the first reaction zone at 10–60° C. and the temperature in the first reaction zone is within the range of 130°–190° C. The preferred range is 150°–190° C. as measured at the center of the first zone, and since the reaction is exothermic, suitable cooling means are usually required to maintain the desired temperature.

In a stirred vessel the agitation is chosen so that a maximum of back mixing takes place in the first reaction zone. This can usually be accomplished by employing a single paddle or flat-bladed turbine agitator in the upper portion of the reaction zone.

The ethylene polymer stream is then passed to a second zone where a second and different peroxygen type catalyst can be fed in with or without additional ethylene. Catalysts suitable for the second reaction zone are chosen from the group represented by organic peroxygen type free-radial polymerization catalysts and include di-tertiary butyl peroxide, p-menthane hydroperoxide, t-butyl peroxyisobutyrate, di-t-butyl diperphthalate, t-butyl peracetate, 1-butyl perbenzoate, dicumyl peroxide, t-butyl hydroperoxide, diisobutyryl peroxide, methyl ethyl ketone peroxide, benzoyl peroxide, acetyl peroxide, lauryl peroxide, and the like.

The temperature in the second reaction zone varies from about 190° C. in the beginning or top of the reaction zone to about 270° C. in the discharge end or bottom of the reaction zone. In a stirred vessel the design is chosen so as to substantially eliminate any back mixing into the first reaction zone. This can be accomplished by means of a baffle between zones in a single reactor together with directional agitation in the second reaction zone.

The process of this invention can be conducted in a single reactor having separate reaction zones preferably separated by a baffle or other separation means. This type of two-zone reactor is preferred for our process. However, the two separate reactions forming our process can be conducted in separate reactors and alternatively the entire process could be carried out in an elongated tubular reactor.

A chain transfer agent can be used to allow polymer of usable melt index to be produced at a low reaction temperature. Chain transfer agents other than propane, which is employed in Example 4, which can be used in the polymerization of ethylene include for example: hydrogen; hexachloroethane; carbon tetrachloride; chloroform; saturated halogenated carboxylic acids and their esters, for example, dichloroacetic acid and its ethyl ester; aldehydes, for example, acetaldehyde; alkyl esters of inorganic oxyacids of sulfur, phosphorus or silicon, for example, diethyl sulphite, triethyl orthophosphate and tetrabutyl orthosilicate respectively; and mercaptans, for example dodecyl mercaptan.

The following examples will demonstrate the process of polymerizing ethylene in accordance with this invention without being restricted thereto. These examples were performed in a single continuous two-zone reactor in which mixing between the two zones was kept to a minimum so that the polymer is produced at two different reaction temperatures.

EXAMPLE 1

Ethylene was compressed and fed to a two-zone pressure vessel fitted with a stirrer, means for controlling the temperature and suitable inlets and outlets to allow the continuous introduction of reactants and continuous discharge of products. The reactor pressure was adjusted to 1120 atmospheres. The temperature of the ingoing ethylene was 39° C. with a top zone reaction temperature of 175° C. and a bottom zone reaction temperature of 225° C. With an over-all ethylene feed rate of 6,450 pounds per hour, 17.8 pounds per hour of a solution comprising 13 weight percent caprylyl peroxide in mineral oil is fed in as the top zone catalyst. Additional ethylene and 41 pounds per hour of a solution comprising 5 weight percent ditertiary butyl peroxide in mineral oil was fed to the second reaction zone.

Under these reaction conditions 1290 pounds per hour of product were produced which amounted to a yield of 574 pounds of polyethylene per pound of top zone catalyst and 6300 pounds of polyethylene per pound of bottom zone catalyst.

The product properties are shown in Table I and are compared to a product made in the same equipment using untreated lauroyl peroxide (Example 7). The product of this example showed great improvement in film transparency, gloss, and haze and was similar to the control sample in all other respects. Of great commercial significance is the three-fold increase in yield.

EXAMPLE 2

Ethylene was compressed and fed to a two-zone pressure vessel as in Example 1. The reactor pressure was adjusted to 1160 atmospheres. The temperature of the ingoing ethylene was 43° C. with a top zone reaction temperature of 160° C. and a bottom zone reaction temperature of 260° C. With an over-all ethylene feed rate of 6450 pounds per hour, 3.5 pounds per hour of a solution comprising 50 weight percent caprylyl peroxide in mineral oil is fed in as the top zone catalyst. 3.2 pounds per hour of a solution comprising 5 weight percent ditertiary butyl peroxide in mineral oil was fed to the second reaction zone.

Under these reaction conditions 1310 pounds per hour of product were produced which amounted to a yield of 750 pounds of polyethylene per pound of top zone catalyst and 8200 pounds of polyethylene per pound of bottom zone catalyst.

As can be seen from Table I, the film transparency, haze, and gloss were greatly improved over the control material. There was a good improvement in film blocking, a further increase in the yield as well as a higher stiffness and Vicat softening point.

EXAMPLE 3

This example is similar to Example 2 as shown by Table I except that the catalyst solvent was changed to a low boiling hydrocarbon which is extracted from the molten product by the recycle gas stream.

As seen from Table I, the product shows an increase in stiffness and Vicat softening point over the material in Example 2. In addition, the film made from the material was almost nonblocking even with the high film transparency.

EXAMPLE 4

This run was performed at quite different reactor conditions even though the same catalyst and equipment was used. The catalyst solution comprised 13 weight percent caprylyl peroxide in mineral oil. Propane was used as a chain transfer agent to make possible a 2 melt index material at 1440 atmospheres pressure and 173° C. temperature. No bottom zone catalyst was added, however, there was some catalyst carried through from the top zone.

The film properties of the polyethylene polymers were still much improved over the control material made in the same equipment.

EXAMPLE 5

This example was performed in the same manner as the previous examples, however, the top zone catalyst was 5 weight percent t-butyl perbenzoate in mineral oil. The reactor pressure was 1195 atmospheres and the minimum top zone temperature attainable was 230° C. because of the low activity of the catalyst.

The use of t-butyl benzoate gave a product having poor optical properties, as shown in Table I, and was included to show the unique features of caprylyl peroxide.

EXAMPLE 6

This run was similar to the previous example except that 5 weight percent t-butyl peracetate was used as the catalyst. A somewhat lower top zone temperature was possible but the optical properties of the film made from the product were still very poor.

EXAMPLE 7

Ethylene was polymerized in the same manner as in the previous examples under the conditions set forth in Table I with the exception that untreated lauroyl peroxide was employed as the top zone catalyst.

Table I shows the poor optical properties of the film made from this product.

*Table I*

REACTION CONDITIONS AND PRODUCT PROPERTIES

| | Control | Examples | | | | | | |
|---|---|---|---|---|---|---|---|---|
| | | 1 | 2 | 3 | 4 | 5 | 6 | 7 |
| Reaction Pressure, Atm. | 1,190 | 1,120 | 1,160 | 1,160 | 1,440 | 1,195 | 1,075 | 1,100 |
| Incoming Ethylene Temp., °C | 41 | 39 | 43 | 37 | 42 | 44 | 41 | 38 |
| Reaction Temperature: | | | | | | | | |
| Top Zone, °C | 174 | 175 | 160 | 160 | 173 | 230 | 210 | 190 |
| Bottom Zone, °C | 252 | 255 | 260 | 260 | 202 | 249 | 249 | 250 |
| Rates Per Hour: | | | | | | | | |
| Pounds Ethylene Fed | 8,900 | 6,450 | 6,450 | 6,570 | 6,300 | 5,400 | 5,500 | 9,000 |
| Pounds Polyethylene Produced | 1,780 | 1,290 | 1,310 | 1,330 | 950 | 1,030 | 960 | 1,810 |
| Pounds T.Z. Catalyst Solution Fed | 124 | 17.8 | 3.5 | 8.4 | 12.1 | 10.8 | No Data | 25.1 |
| Pounds B.Z. Catalyst Solution Fed | 5.6 | 4.1 | 3.2 | 3.2 | None | 5.1 | No Data | 5.7 |
| Catalyst Concentration: | | | | | | | | |
| Top Zone in the Solvent, Wt. Percent | 8 | 13 | 50 | 20 | 13 | 5 | 5 | 18 |
| Bottom Zone | 5 | 5 | 5 | 5 | None | 5 | 5 | 5 |
| Yield—Pounds of Polyethylene per pound of: | | | | | | | | |
| T.Z. Catalyst | 180 | 574 | 750 | 790 | 603 | 1,900 | No Data | 400 |
| B.Z. Catalyst | 7,700 | 6,300 | 8,200 | 8,400 | None | 4,000 | No Data | 6,400 |
| Product Properties: | | | | | | | | |
| Melt Index, g./10 Min | 1.72 | 1.56 | 1.7 | 1.65 | 2.03 | 1.31 | 2.6 | 1.7 |
| Density | 0.9237 | 0.9250 | 0.9250 | 0.9255 | 0.930 | 0.920 | 0.920 | 0.923 |
| Stiffness, p.s.i. | 18,000 | 19,000 | 21,000 | 22,700 | 31,700 | 15,700 | 15,300 | 18,500 |
| Vicat Softening Point, °C | 98 | 98 | 100 | 101 | 108 | 93.0 | 91.0 | 98 |
| Film Transparency, Inches | 160 | 240 | 220 | 200 | 230 | 40 | 4 | 60 |
| Film Gloss, Percent | 59 | 72.7 | 68 | 64 | 62 | 29.9 | 16.4 | 48.8 |
| Film Haze, Percent | 6 | 4.3 | 5.2 | 6 | 5.5 | 18.9 | 34.9 | 8.1 |
| Film Blocking | 4 | 4 | 3 | 2 | 3 | 2 | 2 | 3 |

The polyethylene products produced by the present invention are primarily sought for use in making highly transparent glossy film. The film is used in packaging new clothes and in making garment bags for use by the dry cleaning industry. The film has better impact strength than the so-called medium and high density polyethylenes. It also has the ability to be easily drawn down to a thin film at high production rates. The extremely glossy appearance and high transparency lend eye-appeal to the materials that are covered by it. The products made by the process of this invention show a better combination of the above properties than any polyethylene products now available.

Although the invention has been described in considerable detail with particular reference to certain preferred embodiments thereof variations and modifications can be effected within the spirit and scope of the invention as described hereinabove, and as defined in the appended claims.

This application is a continuation of application Serial No. 861,453, filed December 23, 1959, and now abandoned.

We claim:

1. A process for the polymerization of ethylene which comprises initially partially polymerizing ethylene in the presence of caprylyl peroxide catalyst at a temperature within the range of about 130° to about 190° C. and then further polymerizing said ethylene at a temperature, above the said temperature and within the range of about 190° to about 270° C., the pressure throughout said polymerization being greater than about 500 atmospheres.

2. Process for the polymerization of ethylene which comprises conducting said polymerization in two zones at a temperature in the range of about 130° to 250° C., the catalyst in the first zone being caprylyl peroxide, the temperature in said zone being substantially less than that in the second zone, and the pressure throughout said polymerization being greater than about 500 atmospheres.

3. Process for the polymerization of ethylene which comprises conducting the polymerization in two separate zones in the presence of caprylyl peroxide as the catalyst in the first zone at a temperature in the range of about 130° to about 190° C., the temperature in the other zone being above the said temperature and within the range of about 190° to about 250° C., the pressure throughout the reaction being greater than about 500 atmospheres.

4. Process for the polymerization of ethylene which comprises initially polymerizing ethylene in the presence of caprylyl peroxide catalyst at a temperature within the range of about 130° to about 190° C. and then further polymerizing said ethylene in the presence of ditertiary butyl peroxide catalyst at a temperature above the said temperature and within the range of about 190° to about 270° C., the pressure throughout said polymerization being greater than about 500 atmospheres.

5. Process of claim 1 in which the caprylyl peroxide is introduced in concentrations of 5 to 50 weight percent in an inert organic solvent.

6. Process of claim 2 in which the caprylyl peroxide is introduced in concentrations of 5 to 50 weight percent in an inert solvent.

7. Process of claim 1 in which the temperature range in the initial polymerization is about 150° to about 190° C. and the temperature of the further polymerization is in the range of about 190° to about 250° C.

8. Process of claim 4 in which the temperature range in the initial polymerization is about 150° to about 190° C. and the temperature in the further polymerization is in the range of about 190° to about 250° C.

9. Process of claim 1 in which the temperature in the initial polymerization is about 175° C., the temperature in said further polymerization is about 255° C., and the pressure is about 1120 atmospheres.

10. Process of claim 1 in which the temperature in the initial polymerization is about 160° C., the temperature in said further polymerization is about 260° C., and the pressure is about 1160 atmospheres.

11. Process of claim 5 in which the temperature in the initial polymerization is about 175° C., the temperature in said further polymerization is about 255° C., and the pressure is about 1120 atmospheres.

12. Process of claim 6 in which the temperature in the first zone is about 175° C., the temperature in the other zone is about 255° C., and the pressure is about 1120 atmospheres.

References Cited by the Examiner

UNITED STATES PATENTS 2,964,515  12/60  Rader _____ 260—94.9
2,520,959  9/50   Powers _____ 260—92.8

JOSEPH L. SCHOFER, *Primary Examiner.*